(12) United States Patent
Barth et al.

(10) Patent No.: US 10,009,231 B1
(45) Date of Patent: *Jun. 26, 2018

(54) ADVERTISING WITH A LAYER THREE ROUTING PROTOCOL CONSTITUENT LINK ATTRIBUTES OF A LAYER TWO BUNDLE

(71) Applicant: Juniper Networks, Inc., Sunnyvale, CA (US)

(72) Inventors: Colby Barth, Collegeville, PA (US); David Ward, Los Gatos, CA (US); Hannes Gredler, Pillberg (AT); John E. Drake, Pittsburgh, PA (US)

(73) Assignee: Juniper Networks, Inc., Sunnyvale, CA (US)

( * ) Notice: Subject to any disclaimer, the term of this patent is extended or adjusted under 35 U.S.C. 154(b) by 195 days.

This patent is subject to a terminal disclaimer.

(21) Appl. No.: 14/605,841

(22) Filed: Jan. 26, 2015

Related U.S. Application Data

(63) Continuation of application No. 13/345,243, filed on Jan. 6, 2012, now Pat. No. 8,942,256.

(51) Int. Cl.
*H04L 12/24* (2006.01)
*H04L 12/26* (2006.01)
*H04Q 11/00* (2006.01)

(52) U.S. Cl.
CPC ............ *H04L 41/12* (2013.01); *H04L 43/087* (2013.01); *H04L 43/0829* (2013.01);
(Continued)

(58) Field of Classification Search
CPC ....... H04L 45/00; H04L 45/245; H04L 45/02; H04L 45/50; H04L 49/101; H04L 41/12;
(Continued)

(56) References Cited

U.S. PATENT DOCUMENTS 6,785,843 B1    8/2004   McRae et al.
7,756,027 B1 *   7/2010   Reddy ................ H04L 41/0806
                                                          370/230

(Continued)

OTHER PUBLICATIONS

Awduche et al., "RSVP-TE: Extensions to RSVP for LSP Tunnels," Network Working Group, RFC 3209, Standards Track, Dec. 2001, 61 pp.

(Continued)

*Primary Examiner* — Andrew Lai
*Assistant Examiner* — M Mostazir Rahman
(74) *Attorney, Agent, or Firm* — Shumaker & Sieffert, P.A.

(57) ABSTRACT

In general, techniques are described for extending routing protocol advertisements to include respective attributes of constituent links of an aggregation group. In one example, a network device includes a management interface that receives configuration information that specifies first and second constituent links for a layer two (L2) aggregated interface. The first and second constituent links are physical links connected to respective physical interfaces of forwarding units of the network device. A routing protocol daemon of the control unit generates a link state message that specifies layer three (L3) routing information associated with the aggregated interface and further specifies an attribute of the first constituent link and an attribute of the second constituent link. The routing protocol daemon sends the link state message from the network device to another network device of the network in accordance with a routing protocol.

20 Claims, 5 Drawing Sheets

(52) U.S. Cl.
CPC ..... *H04L 43/0847* (2013.01); *H04Q 11/0066* (2013.01); *H04Q 2011/0083* (2013.01)

(58) Field of Classification Search
CPC ..... H04L 43/0811; H04L 45/62; H04L 45/66; H04L 45/70; H04L 49/102; H04L 49/25; H04L 49/40; H04L 45/12; H04L 45/54; H04J 3/1611; Y02B 60/33
See application file for complete search history.

(56) References Cited

U.S. PATENT DOCUMENTS

| | | | |
|---|---|---|---|
| 8,942,256 B1 | 1/2015 | Barth et al. | |
| 2006/0039384 A1* | 2/2006 | Dontu | H04L 45/00 370/400 |
| 2006/0198359 A1* | 9/2006 | Fok | H04W 24/00 370/351 |
| 2008/0044181 A1 | 2/2008 | Sindhu | |
| 2008/0240095 A1* | 10/2008 | Basturk | H04L 45/00 370/389 |
| 2011/0273990 A1 | 11/2011 | Rajagopalan et al. | |
| 2012/0120809 A1* | 5/2012 | Gero | H04L 43/0811 370/241.1 |

OTHER PUBLICATIONS

Berger et al., "The OSPF Opaque LSA Option," Network Working Group, RFC 5250, Jul. 2008, 16 pp.
Katz et al., "Traffic Engineering (TE) Extensions to OSPF Version 2," Network Working Group, RFC 3630, Sep. 2003, 14 pp.
Moy, "OSPF Version 2," Network Working Group, RFC 2328, Apr. 1998, 204 pp.
"OAM Functions and Mechanisms for Ethernet Based Networks," ITU-T Y.1731,International Telecommunication Union, Telecommunication Standardization Sector of ITU, Series Y: Global Information Infrastructure, Internet Protocol Aspects and Next-Generation Networks, May 2006, 80 pp.
Oran, "OSI IS-IS Intra-Domain Routing Protocol," Network Working Group, RFC 1142, Feb. 1990, 157 pp.
Rosen et al., "Multiprotocol Label Switching Architecture," Network Working Group, RFC 3031, Jan. 2001, 57 pp.
Zimmermann, "OSI Reference Model—The ISO Model of Architecture for Open Systems Interconnection," IEEE Transactions on Communications, vol. 28, No. 4, Apr. 1980, 8 pp.
Prosecution History from U.S. Appl. No. 13/345,243, dated Jul. 8, 2013 through Sep. 16, 2014, 81 pp.

* cited by examiner

ADVERTISING WITH A LAYER THREE ROUTING PROTOCOL CONSTITUENT LINK ATTRIBUTES OF A LAYER TWO BUNDLE

PRIORITY CLAIM

This application is a continuation of U.S. patent application Ser. No. 13/345,243, filed Jan. 6, 2012, the entire content of which being incorporated herein by reference.

TECHNICAL FIELD

The invention relates to computer networks and, more specifically, to path selection within a network.

BACKGROUND

A computer network is a collection of interconnected computing devices that exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices, referred to as routers, maintain routing information that describes routes through the network. A "route" can generally be defined as a path between two locations on the network. Upon receiving an incoming packet, the router examines information within the packet and forwards the packet in accordance with the routing information. To increase bandwidth available on the network, as well as the reliability and performance of the network, a destination router may be connected to a source router through multiple physical links, the physical links being terminated at respective egress ports of the source router. An operator may configure an aggregated interface within the source router to aggregate the multiple physical links as a virtual link referred to as an "aggregation group" or, alternatively, as a "link bundle."

In order to maintain an accurate representation of the network, routers periodically exchange routing information in accordance with defined protocols. Large computer networks, such as the Internet, often include many routers grouped into administrative domains called "autonomous systems." Routers within an autonomous system (AS) generally use interior gateway routing protocols (IGPs) for exchanging routing information internally. Examples of IGPs include Intermediate System to Intermediate System (IS-IS) and Open Shortest Path First (OSPF). Routers advertise links that are members of an aggregation group and connected to an aggregated interface as a single virtual link within IGPs to minimize the number of subnets distributed within an IGP domain.

The OSPF and IS-IS routing protocols are link state IGPs that use link state messages to ensure that the routing topology among routing protocol process instances of the AS routers are synchronized with respect to available interfaces, metrics and other variables associated with network links. OSPF uses Link State Advertisements (LSAs) while IS-IS uses Link State Protocol Data Units to exchange information. A router generating a link state message typically floods the link state message throughout the network such that every other router receives the link state message. In network topologies where routers are connected by point-to-point connections, each router floods link state messages to adjacent routers reachable on each interface to ensure synchronization. In networks using multi-access media, such as an Ethernet network, the routers within the network flood the link state messages to all other routers. In either case, the receiving routers construct and maintain their own network topologies using the link information received via the link state messages.

SUMMARY

In general, techniques are described for extending routing protocol link state messages to include respective attributes of constituent links of an aggregation group. In one example, an administrator aggregates a plurality of outbound physical links for a network router as constituent links of an aggregation group by configuring a layer two (L2) aggregated interface within the network router. The administrator further configures the aggregated interface with layer three (L3) routing information, e.g., a source IP address and a mask, that the network router then advertises, using an IGP such as OSPF or IS-IS, to neighboring routers as a single link within a network topology.

The network router extends link state messages for L2 aggregated interfaces to include additional attributes that describe the respective characteristics of constituent physical L2 links that constitute the aggregation group. That is, in addition to including information that characterizes the L2 aggregated interface for the aggregation group as a whole, an extended link state message includes respective attributes for constituent physical links of the aggregation group. The attributes included within an extended link state message may include, for each constituent link, an indication of the presence of each of the constituent links, an available bandwidth, delay, jitter, optical characteristics such as an optical path and bit error rate (BER), a constituent link identifier, and/or a constituent link-specific color, among other attributes. As a result, network routers that receive extended link state messages may consider attributes for constituent links of an aggregation group when computing a path through the network for a label-switched path (LSP), for example, or otherwise making forwarding decisions that are affected by attribute differences of constituent links of an aggregate group. Advertising constituent link-specific attributes may also improve parity between networks employing aggregation groups and networks that employ parallel layer three (L3) links, while maintaining a reduced number of advertisements sent by network routers due to aggregation.

In one example, a method includes receiving, with a network device of a network, configuration information that specifies first and second constituent links for a layer two (L2) aggregated interface, wherein the first and second constituent links are physical links connected to respective physical interfaces of the network device. The method also includes generating, with the network device, a link state message that specifies layer three (L3) routing information associated with the aggregated interface and further specifies an attribute of the first constituent link and an attribute of the second constituent link. The method also includes sending the link state message from the network device to another network device of the network in accordance with a routing protocol.

In another example, a network device includes a control unit having one or more processors and one or more forwarding units each having one or more interfaces, coupled to respective physical links, to exchange packet data units with other network devices of a network. A management interface of the control unit receives configuration information that specifies first and second constituent links for a layer two (L2) aggregated interface, wherein the first and second constituent links are physical links connected to respective physical interfaces of the forwarding units. A routing protocol daemon of the control unit generates a link state message that specifies layer three (L3) routing information associated with the aggregated interface and further specifies an attribute of the first constituent link and an attribute of the second constituent link, wherein the routing protocol daemon sends the link state message from the network device to another network device of the network in accordance with a routing protocol.

In another example, a method includes receiving, with a network device in accordance with a routing protocol, a link state message for an interface that specifies layer three (L3) routing information associated with the interface and further specifies an attribute of a first constituent link of the interface and an attribute of a second constituent link of the interface. The method also includes computing a path through a network with the network device that includes the first constituent link when the attribute of the first constituent link satisfies a computation constraint for the path and the attribute of the second constituent link does not satisfy the computation constraint.

In another example, network device includes a control unit having one or more processors. A routing protocol daemon of the control unit receives a link state message in accordance with a routing protocol for an interface that specifies layer three (L3) routing information associated with the interface and further specifies an attribute of a first constituent link of the interface and an attribute of a second constituent link of the interface, wherein the routing protocol daemon computes a path through a network that includes the first constituent link when the attribute of the first constituent link satisfies a computation constraint for the path and the attribute of the second constituent link does not satisfy the computation constraint.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
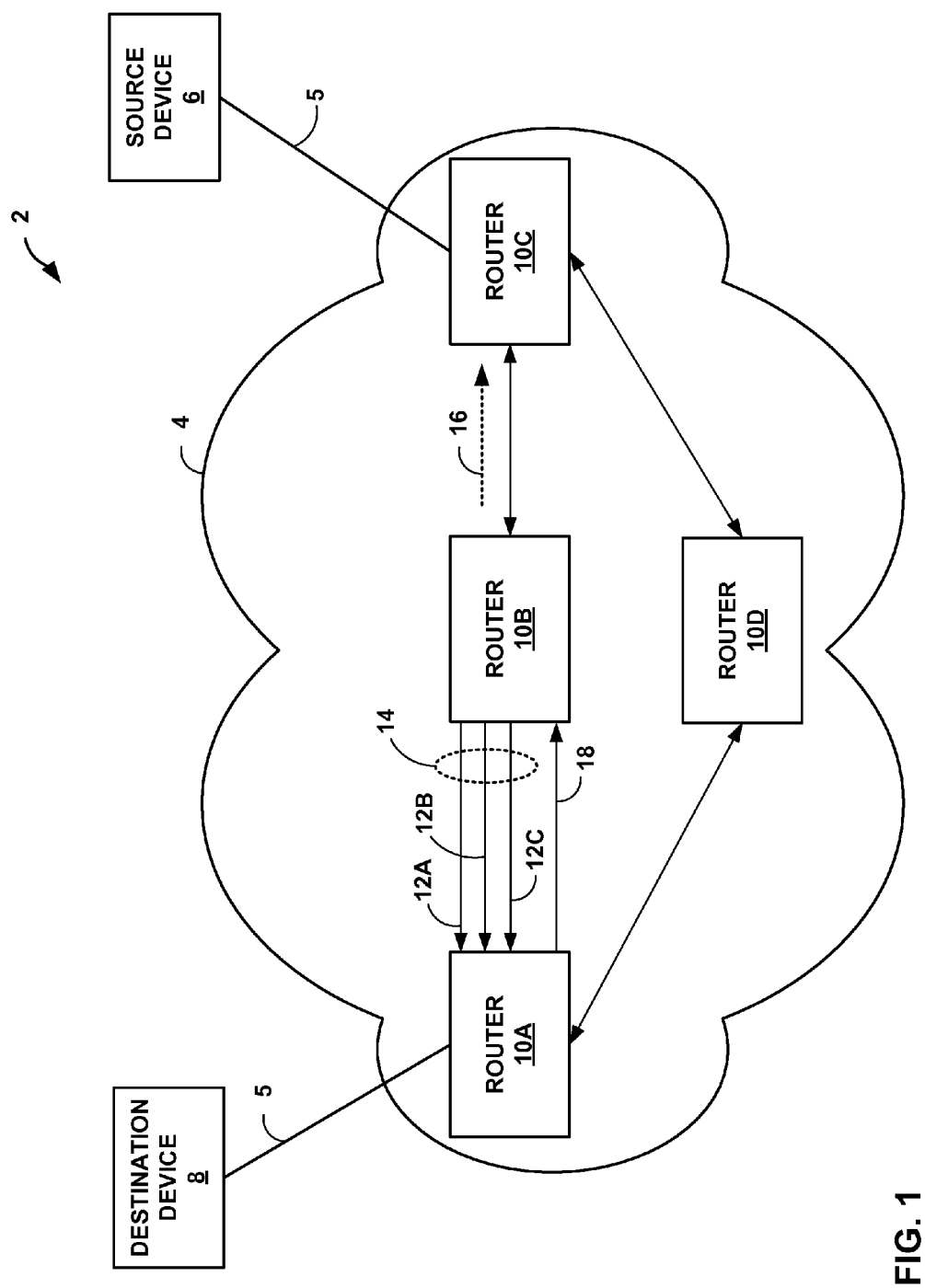
FIG. 1 is a block diagram illustrating an example network system that advertises constituent link attributes in accordance with techniques described in this disclosure.

FIG. 1 is a block diagram illustrating an example network system 2 that advertises constituent link attributes in accordance with techniques described in this disclosure. Network 4 includes routers 10A-10D ("routers 10") that forward network packets, received from source device 6 toward destination device 8. Network 4 may represent a public network, such as the Internet, a private network, such as those owned and operated by an enterprise or service provider, or a combination of both public and private networks. Network 4 may include one or more Wide Area Networks (WANs), Local Area Networks (LANs), Virtual Local Area Networks (VLANs), Virtual Private Networks (VPNs), and/or another type of network. Network 4 may be alternately referred to herein as a Service Provider (SP) network.

In some instances, network 4 may be a label switching network in which network devices such as routers 10, often referred to as Label Switching Routers or LSRs, use Multi-Protocol Label Switching (MPLS) signaling protocols to establish Label Switched Paths (LSPs) for transporting the network packets received from source device 6. The MPLS data-carrying mechanism of network 4 may be viewed as lying between layer 2 (L2) and layer 3 (L3) of the Open Systems Interconnection (OSI) model and is often referred to as a layer 2.5 protocol. Reference to layers followed by a numeral may refer to a particular layer of the OSI model. More information concerning the OSI model can be found in a IEEE publication entitled "OSI Reference Model—the ISO Model of Architecture for Open Systems Interconnection," by Hubert Zimmermann, published in IEEE Transactions on Communications, vol. 28, no. 4, dated April 1980, which is hereby incorporated by reference as if fully set forth herein. Further information regarding MPLS and the various features of MPLS, as well as, general architectural information regarding MPLS can be found in Request for Comments (RFC) 3031, entitled "Multiprotocol Label Switching Architecture," prepared by the Network Working Group of the Internet Engineering Task Force (IETF), dated January 2001, incorporated by reference herein. In some instances, network 4 may offer Generalized MPLS (GMPLS). Although described herein in some instances with respect to MPLS, the techniques of this disclosure are also applicable to GMPLS.

Although shown as a single network 4 in FIG. 1, network 4 may include any number of interconnected networks, either public or private, in which the various networks interconnect to form various virtual networks. The particular configuration of network system 2 is merely an example, and routers 10 may reside in a single network or within multiple networks. In addition, each of routers 10 may represent one of a variety of network devices for forwarding network traffic, such as routers, switches, or bridges. Therefore, although described with respect to routers, aspects of the techniques are applicable to other network devices, such as bridges, switches, gateways, network caches, and network acceleration devices.

In the example of FIG. 1, network system 2 includes a number of source device 6 and a destination device 8 coupled to network 4. Each of source device 6 and destination device 8 may be a personal computer, a laptop computer, a mobile telephone, a network telephone, a television set-top box, a network device integrated into a vehicle, a video game system, a point-of-sale device, a personal digital assistant, an intermediate network device, a network appliance, a supercomputer, a mainframe computer, a data center server or other server, or another type of device capable of interfacing with and communicating over network 4. In some examples, either or both of source device 6 and destination device 8 are customer edge (CE) devices, such as routers or aggregation switches, which connect a customer network (not shown) to network 4.

Source device 6 and destination device 8 connect to network 4 using access links 5 that may include wired and/or wireless communication links The terms "communication link" and "physical link," as used herein, includes any form of transport medium, wired or wireless, and can include intermediate nodes such as network devices. Each of access links 5 may include, for instance, aspects of an asymmetric DSL network, WiMAX, a T-1 line, an Integrated Service Digital Network (ISDN), or wired Ethernet.

A number of physical and logical communication links of network 4 interconnect routers 10 to facilitate control and data communication between the routers. Physical links of network 4 may include, for example, Ethernet PHY, Synchronous Optical Networking (SONET)/Synchronous Digital Hierarchy (SDH), Lambda, or other Layer 2 data links that include packet transport capability. Logical links of network 4 may include, for example, an Ethernet Virtual LAN, an MPLS LSP, or an MPLS with Traffic Engineering LSP (TE LSP). Routers 10 include physical and logical (or "virtual") interfaces that couple to these physical and logical communication links, respectively. Physical interfaces may include, for instance, Packet-over-SONET (POS), SONET (SO), Gigabit Ethernet (GE), serial, Lambda, and/or Ethernet interfaces. In addition, logical interfaces may be configured within any of routers 10 by an operator or other entity to specify characteristics of the physical or logical communication links coupled to the physical interfaces and to provide a reference point for forwarding information within the routers 10.

In the illustrated example, router 10B includes an aggregated logical interface 14 ("aggregated interface 14") that internally aggregates, within router 10B, the logical interfaces of router 10B for outbound physical links 12A-12C (collectively, "aggregation group 12"). Aggregation group 12 may alternatively be referred to as a Link Aggregation Group (LAG) or link bundle. Each of outbound physical links 12A-12C is considered a "constituent link" of aggregation group 12. Hereinafter, outbound physical links 12A-12C may be referred to as constituent links 12A-12C.

In general, an aggregated interface combines two or more physical interfaces, enabling each constituent link coupled to the physical interfaces to equally share the traffic load on a single, aggregated interface network address. An operator or other entity configures a single network address for aggregated interfaced 14 within router 10B. The network address may be an Internet Protocol (IP) address, such as an IPv4 or IPv6 address. As a result, aggregated interface 14 enables each of constituent links 12A-12C to share traffic load on the aggregated interface 14 network address. This allows router 10B to provide load balancing and link redundancy as well as increase available bandwidth to router 10A while consolidating routing processes for constituent links 12A-12C using the single network address for aggregated interface 14. Aggregated interface 14 may include an outbound logical interface for an LSP, such as a TE LSP. Furthermore, while shown as aggregating physical links within a core of network 4, aggregated interface 14 may also aggregate physical links at the network edge.

Each of outbound physical links 12A-12C may be a different type of physical link and/or have differing signal transmission or traffic engineering characteristics. For example, outbound physical link 12A may be Ethernet links coupled to a GE interface of router 10B while outbound physical links 12A, 12B are SONET/SDH links coupled to SO interfaces of router 10B. As another example, each of outbound physical links 12A-12C may be a SONET/SDH or Ethernet link operating over an optical transport network (OTN) and coupled to a physical interface of router 10B, but each of outbound physical links 12A-12C may traverse different optical paths over a heterogonous optical network, for instance; have divergent optical characteristics, maximum transmission units (MTUs), forward error correction counts, bit error rates, delay, and/or jitter characteristics; have different configured link colors or administrative link metrics; and so on. In some cases, each of outbound physical links 12A-12C may include different Dense Wavelength Division Multiplexing (DWDM) systems to transport SONET or Ethernet signals over fiber spans, fiber junctions, and other optical facilities. In this way, outbound physical links 12A-12C may present fiber diversity in their respective routes from router 10B to router 10A. In some examples, router 10B incorporates DWDM termination or other OTN functionality into GE or other physical interfaces to provide IP over DWDM capability. For example, router 10B may include integrated transponders.

Routers 10 employ one or more interior gateway protocols (IGPs) to learn link states/metrics for communication links within the interior of network 4. For example, router 10B may use an Open Shortest Path First (OSPF) or Intermediate System-Intermediate System (IS-IS) protocol to send routing information to routers 10A, 10C, and/or 10D. Routers 10A, 10C, and/or 10D store the routing information to a routing information base that the routers uses to compute routes to destination network prefixes advertised within network 4 by any of routers 10.

In some instances, routers 10 support traffic engineering to improve utilization of network 4 resources. In general, traffic engineering refers to operations to move traffic flow away from the shortest path computed by an interior gateway protocol for network 4 and toward a potentially less congested or otherwise more desirable (from an operational point of view) physical path across the network. For example, a network 4 administrator or routers 10 may establish, using Resource Reservation Protocol with Traffic Engineering extensions (RSVP-TE) or another label distribution protocol (e.g., the Label Distribution Protocol (LDP)), one or more LSP tunnels that connect various pairs of routers 10 to route network traffic away from network failures, congestion, and bottlenecks or to promote certain characteristics for paths, such as fiber diversity, a lower bit error rate, a higher MTU, and son on. RSVP-TE is described more fully in Awduche et al., "RSVP-TE: Extensions to RSVP for LSP Tunnels," Request for Comments 3209, Network Working Group, Internet Engineering Task Force, December, 2001, which is incorporated by reference as if fully set forth herein.

In accordance with techniques of this disclosure, routers 10 execute an extended IGP that advertises attributes of constituent links of an aggregation group. For example, routers 10 may execute IS-IS with traffic engineering extensions (IS-IS-TE) that uses new type-length values (TLVs) to specify attributes of the constituent links within Link State Protocol Data Units. As another example, routers 10 may execute OSPF with traffic engineering extensions (OSPF-TE) that uses a new type of opaque link-state advertisement (LSA) to distribute constituent link attributes. The extended IGP thus advertises characteristics of the aggregation group in addition to those that characterize aggregated interface 14 as a whole, such as configured aggregate bandwidth and IP address/mask. Attributes for each of constituent links 12A-12C included within an extended link state message may include, for each of constituent links 12A-12C, an indication of the presence of each of constituent links 12A-12C, available bandwidth, delay, jitter, optical characteristics such as an optical path and bit error rate (BER), a constituent link identifier, a constituent link-specific color, and/or any other attributes of constituent links 12A-12C described above, among other attributes.

In the illustrated example, router 10B generates an extended IGP link state message 16 that conforms to the techniques herein described to include link-specific attributes for each of constituent links 12A-12C. Extended IGP link state message 16 may also include attributes that describe aggregated interface 14 as a whole. As a result, router 10B may send a single IGP link state message to describe each of constituent links 12A-12C and aggregated interface 14, thus reducing a number of messages that would be required were constituent links 12A-12C to be configured within router 10B as separate layer 3 links, for example. In this way, the techniques may improve parity between networks employing aggregation groups and networks that employ parallel layer three (L3) links, while maintaining an advantage of aggregated groups, i.e., a reduced number of messages.

Routers 10 may store constituent link attributes received in extended IGP link state message 16 to a respective Traffic Engineering Database (TED) that may be distinct from or an extension of a generalized link-state database (LSDB) for the IGP. Each of constituent links 12A-12C may be stored by routers 10 as a separate link in the TED. As a result, routers 10 may consider respective attributes for constituent links 12A-12C configured as aggregated interface 14 when computing a path through network 4 for a label-switched path (LSP), for example, or otherwise making forwarding decisions that are affected by attribute differences of constituent links 12A-12C.

For example, router 10C may execute a shortest-path first (SPF) algorithm over its routing information base to compute forwarding paths through network 4 to router 10A by which destination device 8 is reachable. In some instances, router 10C may execute a constrained SPF (CSPF) algorithm over the IGP TED to compute paths for LSPs subject to various constraints, such as constituent link attribute requirements, input to the CSPF algorithm. For example, router 10A may execute a CSPF algorithm subject to a bandwidth constraint that requires each layer 2 link of a computed path from router 10C to router 10A to have at least a specified of bandwidth. In some cases, the aggregate bandwidth for aggregated interface 14 may satisfy the bandwidth constraint, but none of constituent links 12A-12C are able to satisfy the bandwidth constraint when considered on an individual basis. The CSPF algorithm may therefore select a path through router 10D rather than through router 10B. The CSPF algorithm executed by router 10C may consider any attribute of constituent links 12A-12C received in extended IGP link state message 16 as a constraint.

The techniques may improve a transparency of network 4 by exposing attributes of layer 2 links that are hidden by aggregated interface configurations and conventional IGP advertisements thereof. By enabling routers 10 to consider link characteristics at a finer level of granularity, the techniques may therefore more closely align forwarding and signaling decisions with normative goals of the network 4 operator or service provider.

Figure 2:
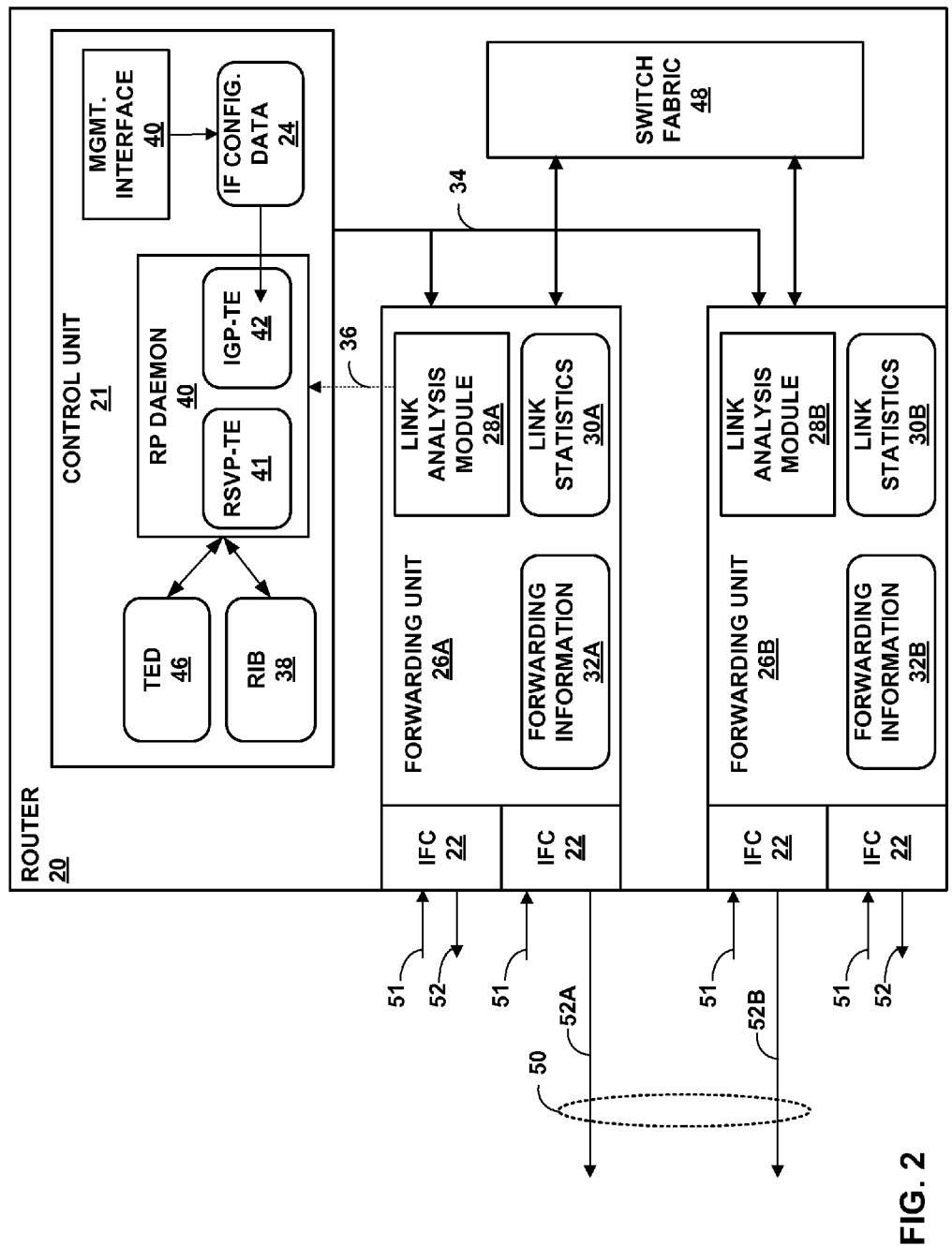
FIG. 2 is a block diagram illustrating an example router configured consistent with the principles of the invention to exchange link state messages extended to include constituent link attributes.

FIG. 2 is a block diagram illustrating an example router 20 configured consistent with the principles of the invention to exchange link state messages extended to include constituent link attributes. Router 20 may, for example, represent any of routers 10 of FIG. 1. In the exemplary embodiment illustrated in FIG. 2, router 20 includes one or more interface cards (IFCs) 22 for sending and receiving packets using inbound physical links 51 and outbound physical links 52. IFCs 22 are typically coupled to physical links 51, 52 via a number of physical interface ports. In general, router 20 receives inbound packets from inbound physical links 51, determines destinations for the received packets, and outputs the packets on outbound physical links 52 based on the destinations. In this way, physical links 51, 52 provide L2 communications media for transmitting packets. Any of physical links 51, 52 may be multi-access media, such as an Ethernet network, point-to-point media such as optical connections, or any of the example communication links described above with respect to FIG. 1.

Router 20 includes a control unit 21 and forwarding units 26A-26B (collectively, "forwarding units 26") coupled to control unit 21 with internal communication link 34. Internal communication link 34 may include a 100 Mbps Ethernet link. Control unit 21 may include one or more processors (not shown in FIG. 2) that execute software instructions, such as those used to define a software or computer program, stored to a computer-readable storage medium (again, not shown in FIG. 2), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, control unit 21 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein. Further, while described with respect to a particular network device, e.g., a router, the techniques of this disclosure are applicable to other types of network devices such as switches, content servers, bridges, multi-chassis routers, or other devices.

Control unit 21 executes the control and routing functionality of router 20. In this respect, control unit 21 represents hardware or a combination of hardware and software of that implements routing protocols by which routing information stored in routing information base 38 ("RIB 38") and traffic engineering stored in traffic engineering database 46 ("TED 46") may be determined. In some instances, TED 46 is implemented as an extended form of RIB 38 and thus subsumes RIB 38. Routing information base 38 may include information defining a topology of a network, such as network 4 of FIG. 1, learned by execution of Interior Gateway Protocol with Traffic Engineering extensions 42 ("IGP-TE 42") by routing protocol daemon 40 ("illustrated as RP daemon 40"). For example, RIB 38 may include a link-state database of physical and logical links (e.g., LSPs advertised as forwarding adjacencies). RIB 38 also includes a forwarding database that stores routes calculated by RP daemon 40 for various destinations. IGP-TE 42 may represent an embodiment of any interior routing protocol that announces and receives traffic engineering information for network links. For example, IGP-TE 42 may represent OSPF-TE or IS-IS-TE. In some instances, IGP-TE 42 may represent an IGP that does not provide traffic engineering extensions. RIB 38 may also include an MPLS routing table that stores MPLS path and label information for LSPs through the network. In such instances, IGP-TE 42 (executed by routing protocol daemon 40) advertises LSPs and associated metrics as forwarding adjacencies to other instances of IGP-TE executing on additional routers of the network.

Routing protocol daemon 40 is a process executed by control unit 21 to perform routing functionality. Routing protocol daemon 40 may resolve the topology defined by routing information in RIB 38 to select or determine one or more active routes through the network to various destinations. Control unit 21 may then update forwarding units 26 with these routes, where forwarding units 26 maintain these routes as respective forwarding information 32A, 32B that map network destinations to one or more of outbound interfaces 52.

Forwarding units 26 receive and forward control and data packets via switch 48 along internal forwarding paths. Router 20 may include more or fewer forwarding units 26 in various examples. Forwarding units 26 may each include one or more packet forwarding engines ("PFEs") coupled to respective sets of IFCs 22 and may each represent, for example, a dense port concentrator (DPC), modular port concentrator (MPC), flexible physical interface card (PIC) concentrator (FPC), or another line card, for example, that is insertable within a router 20 chassis or combination of chassis. Interface cards 22, for instance, may include multiple PICs that each includes one or more inbound/outbound interfaces for physical links 51, 52. Each of forwarding units 26 may include substantially similar components to perform substantially similar functionality, said components and functionality being described hereinafter primarily with respect to forwarding unit 26A. Physical inbound and outbound interfaces of IFCs 22 (e.g., ports) may be specified by identifying the port type, a slot in a router 20 chassis for the corresponding one of forwarding units 26, a PIC, and a port number. For example, "GigE-3/1/2" may internally identify port 2 of PIC 1 on the one forwarding units 20 that occupies slot 3 in the router 20 chassis, and the port is a Gigabit Ethernet port.

Forwarding unit 26A may incorporate DWDM termination or other OTN functionality into IFCs 22 to provide IP over DWDM capability. Forwarding unit 26A may include integrated transponders.

Forwarding units 26 forward network traffic received by IFC 22 via inbound links 51 over outbound links 52 of IFCs 22 in accordance with respective forwarding information 32A, 32B. When forwarding a transient packet, forwarding unit 26A traverses forwarding information 32A based on keying information within a header of the packet to ultimately select a next hop and output interface to which to forward the packet. Based on the selection, forwarding unit 26A may output the packet directly to an output interface of one of IFCs 22 of forwarding 26A or may forward the packet to switch fabric 48 for switching to the proper output interface coupled to forwarding unit 26B. U.S. Patent Publication 2008/0044181, entitled MULTI-CHASSIS ROUTER WITH MULTIPLEXED OPTICAL INTERCONNECTS, describes a multi-chassis router in which a multi-stage switch fabric, such as a 3-stage Clos switch fabric, is used as a high-end forwarding plane to relay packets between multiple routing nodes of the multi-chassis router. The entire contents of U.S. Patent Publication 2008/0044181 are incorporated herein by reference. The techniques of this disclosure are not limited to this architecture. In other embodiments, router 20 may be configured in a variety of ways. In some embodiments, for example, all or portions of control unit 21 and/or forwarding units 26 may be replicated and incorporated directly within IFCs 22. In some embodiments, all or portions of forwarding units 26 may be incorporated directly within control unit 21.

Network operators or other entities, such as network management systems, invoke management interface 40 (illustrated as "mgmt. interface 40") of control unit 21 to modify interface configuration data 24 (illustrated as "if config. data 24") to create one or more aggregated interfaces by aggregating interfaces of IFCs 22. Management interface 40 may include a Simple Network Management Protocol (SNMP) interface, a Device Management Interface (DMI), a command-line interface (CLI), or graphical user interface (GUI), for example.

In the illustrated example, interface configuration data 24 includes configuration data for aggregated interface 50 that includes the physical interfaces for outbound links 52A and 52B. Outbound links 52A, 52B are therefore constituent links of an aggregation group defined by aggregated interface 50. Outbound links 52A, 52B may represent example embodiments of outbound physical links 12A, 12B of FIG. 1. Aggregated interface 50 may represent an example embodiment of aggregated interface 14 of FIG. 1. Each of outbound links 52A, 52B may be configured in interface configuration data 24 with potentially divergent link attributes, such as those described above with respect to FIG. 1, including maximum MTU, configured bandwidth, available bandwidth, link identifier, link color, link type (e.g., Ethernet/SONET), and/or optical path.. In some examples, aggregated interface 50 may include additional outbound physical links coupled to IFCs 22 of any of forwarding units 26.

In addition, link analysis modules 28A, 28B of respective forwarding units 26 determine and store link performance statistics for respective outbound physical links 52A, 52B in respective link statistics 30A, 30B. Link analysis module 28A, for example, may determine the bit error rate (BER) and/or forward error correction (FEC) counts or other optical performance characteristics for outbound physical link 52A. Link analysis module 28A may determine optical performance characteristics using the G.709 framing structure (or "digital wrapper") to exchange management information within a wavelength of signal transmitted by outbound physical link 52A. As other examples, link analysis module 28A may determine delay, jitter, and/or PDU loss rates for outbound physical link 52A using Operation, Analysis, and Maintenance (OAM) techniques. One such OAM tool, referred to as OAM Frame Loss Measurement, standardizes mechanisms for loss measurement in an Ethernet computer network and is described in the Internal Telecommunication Union Telecommunication Standardization Section (ITU-T) recommendation Y.1731, "OAM functions and mechanisms for Ethernet based networks," May, 2006, which is incorporated by reference herein in its entirety. OAM Frame Loss Measurement as described in ITU-T Y.1731, Section 8, defines the Frame Loss Ratio performance metric to apply to Ethernet frames admitted at the ingress L2 flow point of an L2 connection and delivered to the egress L2 flow point of the L2 connection.

Forwarding unit 26A stores link statistics 30A for physical links 51, 52 in a computer-readable storage medium. Forwarding unit 26A offloads link statistics 30A, including link performance statistics for outbound link 52A, to control unit 21 in link statistics upload message 36.

IGP-TE 42 executed by routing protocol daemon 40 implements techniques of this disclosure to advertise link state information for aggregated interface 50 in a single link state message that includes constituent link attributes for each of outbound physical links 52A, 52B. Routing protocol daemon 40 collects both constituent link-specific and aggregated interface 50 attributes from interface configuration data and also receives constituent link-specific performance attributes in link statistics upload message 36. Routing protocol daemon 40 may install the attributes to TED 46. In addition, routing protocol daemon 40 assembles link state information for aggregated interface 50 and for each of outbound physical links 52A, 52B within a link state message. In some examples, routing protocol daemon 40 assembles the link state information for aggregated interface 50 as a hierarchy, each of outbound physical links 52A, 52B inheriting at least some attributes of aggregation interface 50. The link state message may include an LSA that conforms to a version of OSPF or a Link State Protocol Data Unit that conforms to a version of IS-IS, for examples. IGP-TE 42 sends the link state message from router 20 to other routers in the network for use in distinguishing among outbound links 52A, 52B to enable fine-granularity layer 2 link selections for network traffic engineering in accordance with techniques of this disclosure.

In addition to advertising constituent link attributes, IGP-TE 42 receives link state messages from other routers that include attributes for constituent links according to techniques described herein. IGP-TE 42 installs constituent links-specific attributes to TED 46. IGP-TE 42 may install constituent links to TED 46 as separate links within an LSDB. For example, IGP-TE 42 may receive an extended link state message and install each of the constituent links as a separate layer 3 link within TED 46 that includes constituent link-specific attributes and attributes of the aggregated interface also received in the extended link state message.

RSVP-TE 41 of control plane 31 is a signaling protocol that establishes explicitly routed LSPs over a network. In some cases, router 20 is an ingress router for the IGP domain, e.g., a label edge router (LER). Routing protocol daemon 40 may receive a request to compute and signal a path from router 20 to a destination router that requires adherence to a specified constraint. In some cases, a constraint specified in a path computation request may disqualify, as unable to meet the constraint, one or more of outbound physical links 52A, 52B, for example, or one or more constituent links installed to TED 46 after having been received by IGP-TE 42 in link state messages. Responsive to receiving a path request, routing protocol daemon 40 executes CSPF, for example, to prune disqualified constituent links in an attempt to compute a satisfactory path through the network. If routing protocol daemon 40 is able to compute a satisfactory path, RSVP-TE 41 establishes a TE LSP for the path.

For example, RSVP-TE 41 may receive an explicit routing path (ERO) from routing protocol daemon 40, for example, for a new LSP tunnel as well as a configured metric for the LSP tunnel. RSVP-TE 41 requests downstream routers to bind labels to a specified LSP tunnel set up by router 20 and may direct downstream routers of the LSP tunnel to reserve bandwidth for the operation of the LSP tunnel. In addition, RSVP-TE 41 may install MPLS forwarding state to forwarding information 32A, 32B to reserve bandwidth for a selected one of outbound links 52A, 52B for aggregated interface 50 for the LSP tunnel and, once the LSP is established, to map a label for the LSP to network traffic, which is then forwarded by forwarding units 26 in accordance with the MPLS forwarding state for the LSP. The set of packets assigned by router 20 to the same label value for an LSP tunnel belong to a particular forwarding equivalence class (FEC) and define an RSVP flow.

Some examples of router 20 may perform a combination of constituent link-specific attribute advertisement and path signaling using constituent link-specific attributes. Some examples of router 20 may perform one or the other. For examples, some examples of router 20 may not include a routing protocol daemon 40 that executes RSVP-TE 41 to signal TE LSPs.

Figure 3:
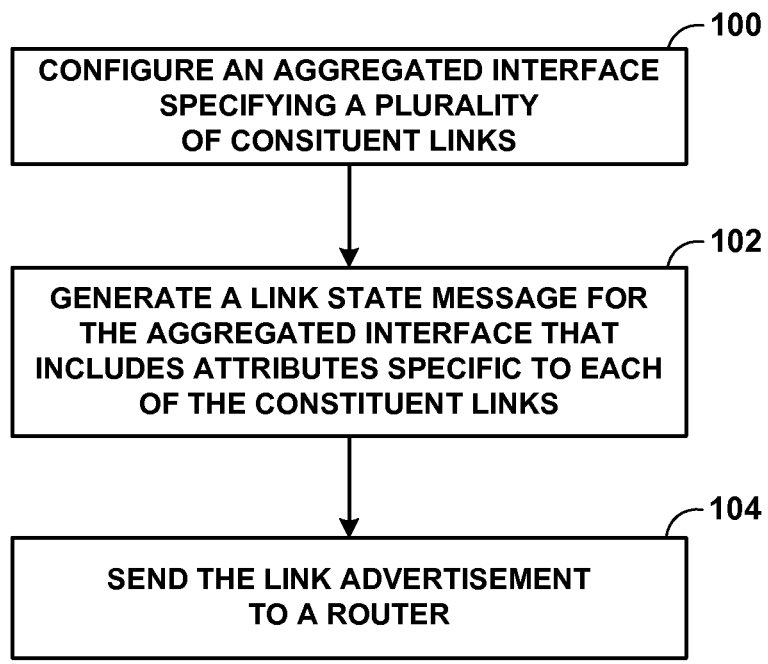
FIG. 3 is a flowchart illustrating an example mode of operation for example router operating according to principles of this disclosure to advertise attributes for constituent links of an aggregation group.

FIG. 3 is a flowchart illustrating an example mode of operation for example router 20 operating according to principles of this disclosure to advertise attributes for constituent links of an aggregation group. Management interface 40 receives configuration information to configure, in interface configuration data 24, an aggregated interface that specifies a plurality of constituent links (100). Example aggregated interface 50 specifies constituent outbound physical links 52A, 52B. Routing protocol daemon 40 collects link-specific attributes for constituent links of the aggregated interface and generates, in conformance to a routing protocol, a link state message for the aggregated interface that includes the link-specific attributes for the constituent links (102). Routing protocol daemon 40 then sends the generated link state message to another router in a routing protocol advertisement, e.g., an IGP-TE 42 advertisement (104).

Figure 4:
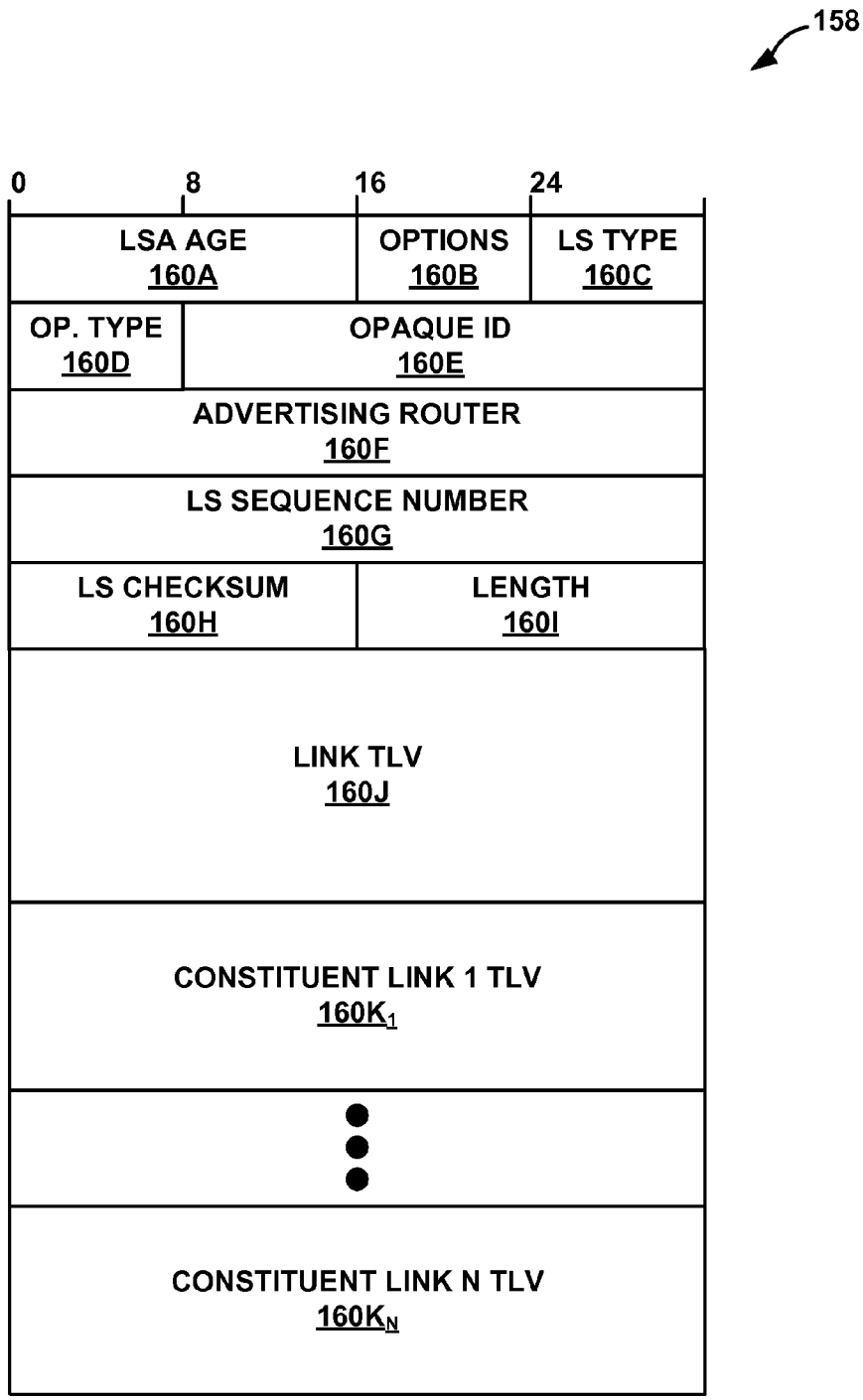
FIG. 4 is an example of a link state message for carrying aggregate interface and constituent link-specific attributes as described herein.

FIG. 4 is an example of a link state message 158 for carrying aggregate interface and constituent link-specific attributes as described herein. Link state message 158, as shown in the exemplary embodiment of FIG. 4, complies with the OSPF protocol in that it adheres to the four byte width limitation specified by the OSPF protocol. That is, link state message 158 has a set of four-byte rows, as reflected in FIG. 4 by the [0..31] bit range for each row shown at the top of link state message 158. Further details of the format of OSPF link state messages can be found in "OSPF Version 2," RFC 2328, Internet Engineering Task Force (IETF), April 1998, incorporated herein by reference.

In this example, link state message 158 conforms to a format for a class of OSPF LSAs referred to as "Opaque LSAs." Opaque LSAs in general, and link state message 158 in particular, includes a standard LSA header followed by application-specific information that may be used directly by OSPF or by another application. Additional details regarding Opaque LSAs are found in "The OSPF Opaque LSA Option," RFC 5250, July 2008, which is incorporated by reference herein.

As shown in FIG. 4, link state message 158 includes link state message age field 160A, options field 160B, and LS type field 160C. LS age field 160A typically specifies the age of the link state message bearing link state message 158 in seconds and is used to distinguish between two link state messages specifying the same link state message sequence number in their respective LS sequence number field 160G. Options field 160B may specify which optional capabilities are associated with the link state message bearing link state message 158. LS type field 160C indicates the format and function of the link state message bearing link state message 158, i.e., the type of link state message. Opaque LSAs are Type 9, 10, and 11 link state advertisements.

The link-state identifier of link state message 158 is divided into opaque type field 160D and opaque identifier

160E. Opaque type field 160D may specify a registered or unregistered value for a "constituent link type" that indicates to receiving routers that link state message 158 carries constituent link-specific attributes for one or more constituent links of an aggregation group defined by an aggregated interface. Opaque identifier 160E identifies the piece of the routing domain that is being described by link state message 158.

Link state message 158 also includes advertising router field 160F, link state sequence number field 160G, link state checksum field 160H, and length field 160I. Advertising router field 160F specifies the OSPF router identifier of the originator of link state message 158. LS sequence number field 160G is a signed 32-bit integer used to detect old and duplicate link state messages. LS checksum field 160H indicates whether the link state message accompanying link state message 158 contains errors. Length field 160I indicates the length of link state message 158. Although shown as containing header fields 160A-160I ("header fields 160"), link state message 158 may contain more or fewer header fields 160 in some examples.

Link state message 158 is arranged hierarchically to include link type-length-value (TLV) field 160J and one or more constituent link TLVs $160K_1$-$160K_N$ (collectively, "constituent link TLVs 160K"). Link TLV 160J describes attributes of a network link that is configured on a router as an aggregated interface, such as any of aggregated interfaces 14, 50 described above. Link TLV 160J may be arranged similarly to the link TLV described in "Traffic Engineering (TE) Extensions to OSPF Version 2," RFC 3630, Network Working Group of IETF, September 2003, which is incorporated herein by reference. That is, link TLV 160J may include one or more sub-TLVs that describe attributes of the aggregated interface, e.g., link type, link identifier, local interface IP address, remote interface IP address, TE metric, and maximum bandwidth. Each of the constituent links described by constituent link TLVs 160K may share, or "inherit," one or more of the aggregated interface attributes.

Each of constituent links TLVs 160K is a newly defined TLV that may only appear in a link state message bearing the constituent link type in opaque type field 160D. In the event such a type is designated in opaque type field 160D, an OSFP routing protocol supporting the techniques described herein may receive and process the link state message to extract and record the attributes for one or more constituent links of an aggregation group to a TED. The receiving router may subsequently use these attributes to compute paths through the routing domain using constraints that distinguish attribute values. Each of constituent links TLVs 160K includes one or more sub-TLVs that specify an attribute type and value for one or more attributes of the constituent links of the aggregated interface described by link TLV 160J. For example, a sub-TLV of any of constituent link TLVs 160K may specify, for the corresponding constituent link, an attribute type and value for a link identifier, available bandwidth, delay, jitter, optical characteristics such as an optical path and bit error rate (BER), a link color, and/or any other attributes of constituent links described above, among other attributes.

Furthermore, while described in the context of an OSPF link state message, the semantic content of the extensions described above is essentially identical to corresponding extensions to IS-IS. In some examples, a router may generate an extended IS-IS Link State Protocol Data Unit that incorporates one or more of link TLV 160J and constituent link TLVs 160K as sub-TLVs of the link state protocol data unit to advertise constituent link attributes in accordance with techniques described herein. IS-IS is described in "OSI IS-IS Intra-domain Routing Protocol," RFC 1142, Network Working Group of IETF, February 1990, the entire contents of which is incorporated herein by reference.

Figure 5:
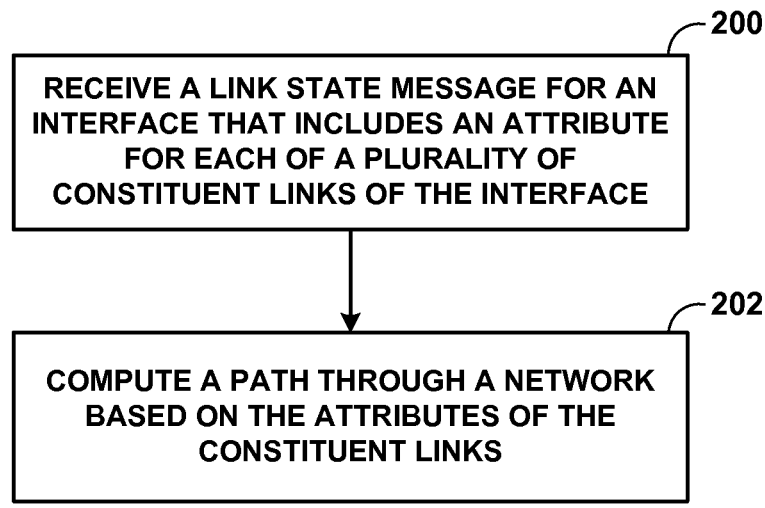
FIG. 5 is a flowchart illustrating an example mode of operation for an example router operating according to principles of this disclosure to receive attributes for constituent links of an aggregation group and compute paths based on the constituent link-specific attributes.

FIG. 5 is a flowchart illustrating an example mode of operation for example router 20 operating according to principles of this disclosure to receive attributes for constituent links of an aggregation group and compute paths based on the constituent link-specific attributes. Routing protocol daemon 40 executes IGP-TE 42 to receive, from another router, a link state message for an interface that includes attributes specific to each of a plurality of constituent links of the interface (200). Based on the constituent link-specific attributes, routing protocol daemon 40 may compute a path through a network that includes one of the constituent links that satisfies a computation constraint for the path (202).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache). The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
receiving, by a network device of a network, configuration information that specifies a first constituent link and a second constituent link for a layer two (L2) aggregated interface, wherein the first constituent link and the second constituent link comprise respective physical links coupled to respective physical interfaces of the network device;
generating, by the network device, a link state message that specifies layer three (L3) routing information associated with the aggregated interface and includes:
(a) a first field that specifies an attribute of the first constituent link, wherein the attribute of the first constituent link comprises one of a maximum transmission unit, link color, administrative metric, optical path, link type, link identifier, performance statistic value, configured bandwidth, and available bandwidth,
(b) a second field that specifies an attribute of the second constituent link; and
sending, by the network device to another network device of the network, the link state message in accordance with a routing protocol.

2. The method of claim 1,
wherein each of the first constituent link and a second constituent link are L2 links, and
wherein the configuration information for the aggregated interface defines an L3 network address that sources traffic forwarded by the network device over each of the first constituent link and a second constituent link.

3. The method of claim 1, wherein the link state message specifies at least one attribute of the aggregated interface.

4. The method of claim 1, wherein the link state message comprises one of a single Opaque Link State Advertisement that conforms to an Open Shortest Path First interior gateway routing protocol or a single Link State Protocol Data Unit that conforms to an Intermediate System to Intermediate System interior gateway routing protocol.

5. The method of claim 1, further comprising:
determining a first performance statistic value for the first constituent link and a second performance statistic value for the second constituent link,
wherein the attribute of the first constituent link comprises the first performance statistic value for the first constituent link, and
wherein the attribute of the second constituent link comprises the second performance statistic value for the second constituent link.

6. The method of claim 5, wherein the first performance statistic value is one of a jitter, delay, bit error rate, forward error correction count, packet data unit loss value, and optical performance characteristic value.

7. A network device of a network, the network device comprising:
a first physical interface;
a second physical interface;
one or more processors configured to receive configuration information that specifies a first constituent link and a second constituent link for a layer two (L2) aggregated interface,
wherein the first constituent link comprises a first physical link coupled to the first physical interface, and
wherein the second constituent link comprises a second physical link coupled to the second physical interface,
wherein the one or more processors are further configured to generate a link state message that specifies layer three (L3) routing information associated with the aggregated interface and includes:
(a) a first field that specifies an attribute of the first constituent link, wherein the attribute of the first constituent link comprises one of a maximum transmission unit, link color, administrative metric, optical path, link type, link identifier, performance statistic value, configured bandwidth, and available bandwidth;
(b) a second field that specifies an attribute of the second constituent link, and
wherein the one or more processors are further configured to send, to another network device of the network, the link state message in accordance with a routing protocol.

8. The network device of claim 7,
wherein each of the first constituent link and a second constituent link are L2 links, and
wherein the configuration information for the aggregated interface defines an L3 network address that sources traffic forwarded by the network device over each of the first constituent link and a second constituent link.

9. The network device of claim 7, wherein the link state message specifies at least one attribute of the aggregated interface.

10. The network device of claim 7, wherein the link state message comprises one of a single Opaque Link State Advertisement that conforms to an Open Shortest Path First interior gateway routing protocol or a single Link State Protocol Data Unit that conforms to an Intermediate System to Intermediate System interior gateway routing protocol.

11. The network device of claim 10,
wherein the one or more processors are further configured to determine a first performance statistic value for the first constituent link and a second performance statistic value for the second constituent link,
wherein the attribute of the first constituent link comprises the first performance statistic value for the first constituent link, and
wherein the attribute of the second constituent link comprises the second performance statistic value for the second constituent link.

12. The network device of claim 11, wherein the first performance statistic value is one of a jitter, delay, bit error rate, forward error correction count, packet data unit loss value, and optical performance characteristic value.

13. A method comprising:
receiving, by a network device in accordance with a routing protocol, a link state message for a layer two (L2) aggregated interface, the link state message including:
(a) layer three (L3) routing information associated with the aggregated interface,
(b) a first field that specifies an attribute of a first constituent link for the aggregated interface, wherein the attribute of the first constituent link comprises one of a maximum transmission unit, link color, administrative metric, optical path, link type, link identifier, performance statistic value, configured bandwidth, and available bandwidth,
(c) a second field that specifies an attribute of a second constituent link for the aggregated interface; and
computing, by the network device in response to determining the attribute of the first constituent link satisfies a computation constraint for a label switched path (LSP) and the attribute of the second constituent link does not satisfy the computation constraint for the LSP, a path for the LSP that includes the first constituent link.

14. The method of claim 13, further comprising:
storing the attribute of the first constituent link and the attribute of the second constituent link to a traffic engineering database,
wherein computing the path through the network to include the first constituent link comprises computing, by the network device, the path using the traffic engineering database.

15. The method of claim 13, wherein the link state message comprises an attribute for the aggregated interface, the method further comprising:
storing the first constituent link to the traffic engineering database as a first L3 link that is associated with the L3 routing information and with the attribute of the first constituent link; and
storing the second constituent link to the traffic engineering database as a second L3 link that is associated with the L3 routing information and with the attribute of the second constituent link.

16. The method of claim 13, further comprising:
receiving, by the network device, a packet data unit; and
forwarding, by the network device, the packet data units along the computed path toward the first constituent link.

17. A network device comprising:
one or more processors configured to receive, in accordance with a routing protocol, a link state message for a layer two (L2) aggregated interface, the link state message including:
(a) layer three (L3) routing information associated with the aggregated interface,
(b) a first field that specifies an attribute of a first constituent link for the aggregated interface, wherein the attribute of the first constituent link comprises one of a maximum transmission unit, link color, administrative metric, optical path, link type, link identifier, performance statistic value, configured bandwidth, and available bandwidth,
(c) a second field that specifies an attribute of a second constituent link for the aggregated interface; and
wherein the one or more processors are further configured to, in response to determining the attribute of the first constituent link satisfies a computation constraint for a label switched path (LSP) and the attribute of the second constituent link does not satisfy the computation constraint for the LSP, a path for the LSP that includes the first constituent link.

18. The network device of claim 17, further comprising:
a traffic engineering database,
wherein the one or more processors are further configured to store the attribute of the first constituent link and the attribute of the second constituent link to the traffic engineering database, and
wherein to compute the path through the network to include the first constituent link the one or more processors are further configured to compute the path using the traffic engineering database.

19. The network device of claim 17,
wherein the link state message comprises an attribute for the aggregated interface,
wherein the one or more processors are further configured to store the first constituent link to the traffic engineering database as a first L3 link that is associated with the L3 routing information and with the attribute of the first constituent link, and
wherein the one or more processors are further configured to store the second constituent link to the traffic engineering database as a second L3 link that is associated with the L3 routing information and with the attribute of the second constituent link.

20. The network device of claim 17, further comprising:
a forwarding unit configured to receive a packet data unit, and
wherein the forwarding unit is further configured to forward the packet data unit along the path for the LSP using the first constituent link.

* * * * *